April 29, 1930.  J. F. WHITE  1,756,044
LURE CARRIER FOR RACES
Filed Jan. 31, 1927
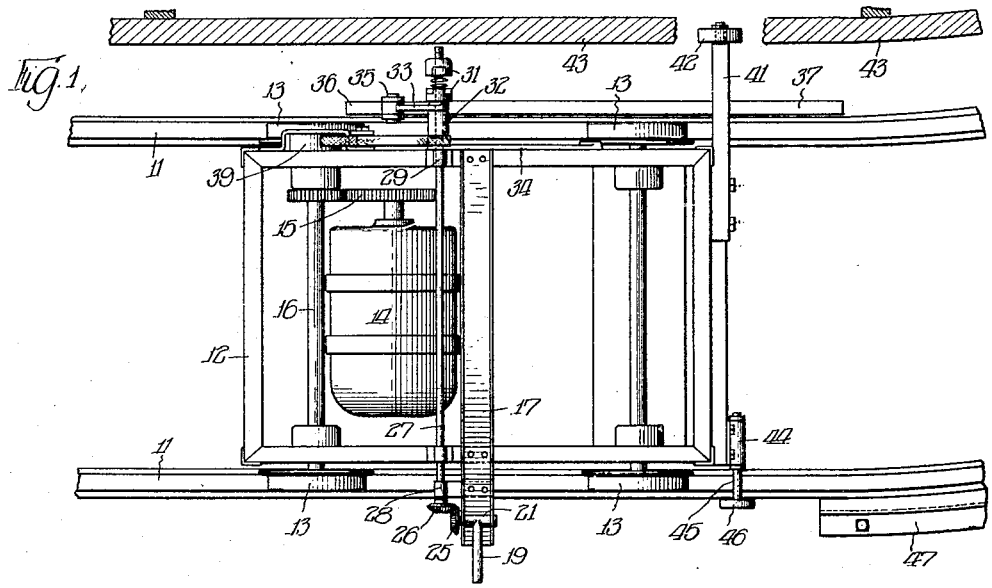
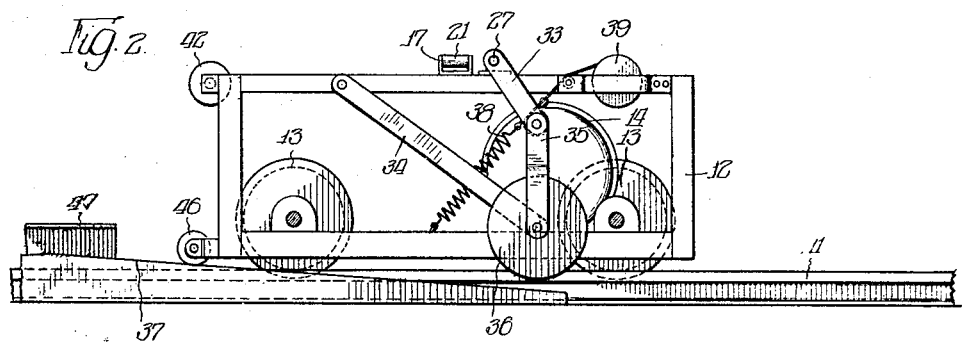
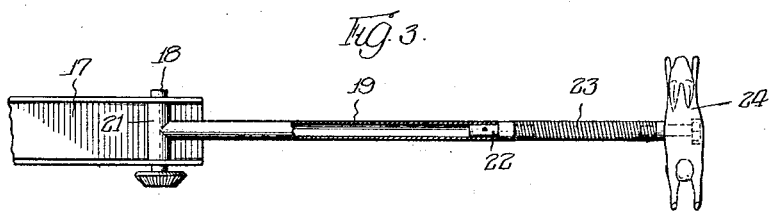
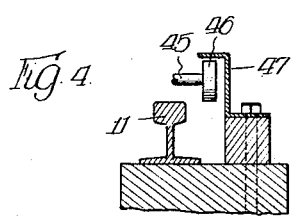
Inventor:
John F. White
By Walter M. Fuller
Atty.

Patented Apr. 29, 1930

1,756,044

UNITED STATES PATENT OFFICE

JOHN F. WHITE, OF CHICAGO, ILLINOIS, ASSIGNOR TO HARRY B. STAVER, OF CHICAGO, ILLINOIS

LURE CARRIER FOR RACES

Application filed January 31, 1927. Serial No. 164,731.

My invention pertains to features of betterment and advantage in appliances for transporting lures over a race-track, in advance of the racing animals, such as dogs, in a manner to deceive the latter into assuming that the traveling decoy or lure, such as a rabbit, is in reality a live animal attempting to escape, thus affording an excellent stimulus or spur for the development of the best racing qualities or abilities in the dogs.

In the preferred embodiment of the invention, the lure makes the ordinary jumps or bounds of a live rabbit and it is also capable of effecting greater leaps to jump over hurdles or barriers when the latter are employed, as they frequently are in each set of races.

One aim of the invention is to provide a simple construction of this general character which can be economically manufactured, which is unlikely to become damaged in service, even though the speed at which the lure is conveyed is quite rapid, and which is effective and satisfactory in results.

To enable those skilled in this art to have a full and complete comprehension of the invention, my present preferred embodiment of the same has been illustrated in the accompanying drawing, throughout the several views of which like reference characters have been employed to designate the same parts in order to facilitate an understanding of the invention from the illustrations.

In this drawing:

Figure 1 is a fragmentary plan view of the appliance with the lure-carrying arm broken off;

Figure 2 is a fragmentary elevation of the far side of the appliance as shown in Figure 1;

Figure 3 is a plan view of the lure and its supporting structure, the latter being partly broken away to illustrate the construction; and Figure 4 is a detail section of a portion of the mechanism which assists in the smooth operation of the truck or car carrying the lure.

By reference to this drawing, it will be observed that the novel and improved apparatus includes a trackway with a pair of rails 11, 11 on which a truck or car 12, having the usual flanged carrying-wheels 13, 13, is designed to travel at a comparatively high speed, being driven in any convenient manner, as by an electric-motor 14 mounted thereon in the customary way and geared at 15 to one of the axles 16, such motor receiving its electric current from a third rail or trolley wire, not shown.

Such trackway is located alongside of the race-course, on which the dogs travel and the electric-truck is provided for carrying or conveying the lure or decoy on an extended arm over such race-track, ahead of the dogs, to induce them to display their speed and racing abilities.

A channel-bar 17 is fixedly mounted on the top of, and transversely of, the truck-frame, extending beyond the latter somewhat on that side toward the race-track, as is fully depicted in Figure 1.

A short shaft 18 is rockingly mounted in aligned apertures or bearings in the parallel, upstanding flanges of the bar 17, on the protruding or overhanging part of the latter, such element 18 forming the fulcrum or hinge-pin of an outstanding, elongated tube or pipe 19 having a cross member 21 at its inner end mounted on and fixed to the shaft 18, whereby such part 19 is capable of swinging up and down in a vertical plane located crosswise of the truck and is limited as to its descent by contact with the web of the channel-bar below it.

The outer end of such tubular member 19 is provided with a plug 22 pinned therein and on which is mounted the inner end of a spring 23, coiled in the present instance, carrying at its outer end a lure or decoy 24 in the shape of an enticing rabbit.

Under ordinary running, the vibration of the car during its rapid travel causes the rabbit by reason of such flexible mounting to oscillate up and down more or less, which movement combined with the forward travel of the car gives the lure the appearance of making ordinary rabbit jumps or bounds.

Supplemental means are provided to cause the decoy to make greater leaps over hurdles or barriers, and, to this end, shaft 18 is equipped with a bevel-gear 25 in mesh with a similar bevel-gear 26 on a cross-shaft 27 oscillatory in suitable bearings 28 and 29 on the truck-frame.

At its other end, such shaft 27 has a clutch connection 31 with the hub 32 of an arm 33, such hub being mounted on the shaft, so that when the clutch is active any movement of arm 33 will rock the shaft and elevate or lower the lure through the gear connection, whereas, when the clutch is thrown out of action, the hub will rock idly on the shaft when the arm is oscillated.

Another arm 34 is fulcrumed on the same side of the truck or car and the ends of both arms 33 and 34 are joined together by a link 35, such articulated structure carrying a wheel 36 adapted to cooperate at intervals with spaced cams, only one 37 of which is shown, located at such positions as to cause the rabbit to make the super-leaps over the hurdles.

In order to hold the roller or wheel 36 and its supporting means down yieldingly, so that the roller may perform its work efficiently, a coiled, contractile spring 38 is connected at one end to the arm 33 and at its other, or lower end, to the truck or car-frame.

To prevent the occurrence of any objectionable rebounds, an ordinary fabric-strap snubber 39, such as is frequently used on automobiles and which forms an ordinary article of commerce, is mounted on the upper part of the truck-frame, and it has the end of its strap operatively connected to the arm 33.

When, therefore, the car comes to a position opposite a hurdle, the roller ascends the stationary cam corresponding thereto, causing the upward rocking of the arm 33 and a corresponding lifting of the rabbit sufficient to enable it to pass over such barrier in what appears to be an ordinary leap of a real live rabbit.

As soon as such jump has been completed, the roller runs down the other slope of the cam and permits the rabbit to descend to normal position, the snubber or shock-absorber eliminating undue strains, rebounds, excessive movements, etc.

The electric-car necessarily travels at a high speed with the result that, in rounding curves especially, it tends to rock or vibrate, thus unduly shaking the flexibly-supported rabbit and its mounting.

To reduce or eliminate such tendency, supplemental means are employed to hold the car more reliably on its rails and to cause it to travel along more smoothly.

Accordingly, the front end of the car-truck has an outstanding arm 41 rigidly and fixedly mounted thereon and carrying at its free end a roller 42 arranged to travel below a stationary bar 43 with a slight normal clearance between them.

If the car or carrier tends to rock any substantial amount, the roller will engage the under surface of the bar and act as a confining or restricting means.

Also, at the front of the car-truck, there is a bearing 44 for a laterally-projecting shaft 45 carrying a roller 46 designed at the curves of the rails to travel under the inwardly-directed top flange of a similarly-curved, suitably-mounted, stationary Z bar 47.

A small clearance only is provided between the roller and such flange so that, if the car-truck rocks even a slight amount, these two cooperating elements will limit such action within negligible degrees.

By these means, the car is held down on its rails and all vibratory or rocking movements thereof are reduced in substantial measure.

Obviously, this invention is not limited and confined to the exact and precise details of structure illustrated and described and these may be modified within comparatively wide ranges without departure from the heart and essence of the invention as defined by the appended claims and without the loss of any of its substantial benefits and advantages.

The member 43 may be continuous and of the whole length of the trackway or it may be discontinuous and located only in conjunction with the spaced cams 37, it being obvious that, when the roller 36 strikes the cam with sufficient force to rock the lure, there is a tendency to lift the truck or car from the rails and this is overcome or counteracted by the engagement of the roller 42 with the underside of the member 43.

I claim:

1. The combination of a carriage, an arm hinged on said carriage to rock in a vertical plane transverse to the direction of travel of said carriage, a lure, a flexible mounting for said lure on said arm, and means to rock said arm on its hinged mounting at intervals to cause the lure to leap hurdles.

2. The combination of a carriage, an arm hinged on said carriage to rock in a vertical plane transverse to the direction of travel of said carriage, a lure, a flexible mounting for said lure on said arm, and means to rock said arm on its hinged mounting at intervals to cause the lure to leap hurdles, said latter means including stationary spaced cam means.

3. The combination of a carriage, an arm hinged on said carriage to rock in a vertical plane transverse to the direction of travel of said carriage, a lure, means mounting said lure on said arm, and means to rock said arm on its hinged mounting at intervals to cause the lure to leap hurdles.

4. The combination of a carriage, an arm hinged on said carriage to rock in a vertical plane transverse to the direction of travel of the carriage, a lure, means to mount said lure on said arm, a shaft rockingly mounted on said carriage, a gear connection between said shaft and arm whereby turning of the shaft raises or lowers said arm, stationary cam means, and operating means connected to said shaft and adapted to coact with said cam means to cause the oscillation of said shaft and leaping movements of said lure.

5. The combination of a carriage, an arm hinged on said carriage to rock in a vertical plane transverse to the direction of travel of the carriage, a lure, means to mount said lure on said arm, a shaft rockingly mounted on said carriage, a gear connection between said shaft and arm whereby turning of the shaft raises or lowers said arm, stationary cam means, operating means connected to said shaft and adapted to coact with said cam means to cause the oscillation of said shaft and leaping movements of said lure, a spring tending to hold said operating means down to its working position, and a snubber acting in opposition to said spring.

6. The combination of a carriage, a trackway on which said carriage is adapted to travel, an arm hinged on said carriage to rock in a vertical plane transverse to the direction of travel of said carriage, a lure on said arm, means to rock said arm including a stationary cam adjacent to said trackway and including a clutch on the carriage which when thrown out of action renders said cam inoperative to rock said arm and its lure.

In witness whereof I have hereunto set my hand.

JOHN F. WHITE.